March 5, 1935.  W. H. SMITH  1,993,312
PRESS FOR MOLDING PLASTIC SUBSTANCES
Filed Feb. 7, 1934  3 Sheets-Sheet 1

INVENTOR
W. H. SMITH
BY
ATTORNEY

March 5, 1935. W. H. SMITH 1,993,312
PRESS FOR MOLDING PLASTIC SUBSTANCES
Filed Feb. 7, 1934 3 Sheets-Sheet 3

INVENTOR
W. H. SMITH
BY
ATTORNEY

Patented Mar. 5, 1935

1,993,312

UNITED STATES PATENT OFFICE 1,993,312

PRESS FOR MOLDING PLASTIC SUBSTANCES

William Herbert Smith, East Molesey, England

Application February 7, 1934, Serial No. 710,200
In Great Britain February 8, 1933

23 Claims. (Cl. 25—97)

This invention relates to presses for molding plastic substances and has for its object to provide power-driven semi-automatic operating means for a press such as is described in my prior United States Patent No. 1,542,739.

This press comprises a mold adapted to contain the material to be molded, a toggle mechanism adapted to apply pressure to the material, a second toggle mechanism adapted to eject the compressed material from the mold, a transmission lever connected at different points to both said toggle mechanisms, a pressure plate at each end of the mold and interconnecting mechanism causing the pressure plates to move in opposite directions in relation to the mold by the operation of the transmission lever.

The sequence of operations in this known form of press is as follows:—filling the mold when the bottom pressure plate is at its lowest position, striking off the excess material from the top of the mold, engaging the top pressure plate with the interconnecting mechanism by hand, actuating the compression toggle to compress the material in the mold, actuating the ejection toggles to eject the molded product and returning both said toggles to their initial positions.

More specifically, therefore, the object of the invention is to produce this sequence of operations, with the exception of the engagement of the top pressure plate with the interconnecting mechanism, by mechanical means which are preferably driven from a single shaft.

A further object of the invention is to provide an additional step in the sequence of operations, namely a shaking operation, which is also effected by the said mechanical means.

Another object of the invention is to provide a device whereby the drive for said mechanical means is automatically interrupted just before the compression operation takes place, and is automatically continued when the top pressure plate is engaged with the interconnecting mechanism by hand.

A still further object of the invention is to provide a feed device for feeding material to the mold which is capable of being operatively connected to the said mechanical driving means when desired.

With these and other objects in view the invention consists in the novel combinations and arrangements hereinafter described in detail and set out in the accompanying claims.

In the accompanying drawings which illustrate the invention and in which corresponding parts are designated by the same reference, Fig. 1 shows a side elevation of the machine with parts of the casing removed to show the compression and extrusion shafts driving mechanism.

Fig. 2 shows an elevation of the other side of the machine to that shown in Fig. 1.

As stated above the mechanism is so arranged that the required movements are imparted to a compression shaft 1 and an ejection shaft 2 in the required sequence in order that the press may work in the same manner as the hand-operated press described in my previous United States patent specification No. 1,542,739, except for the shaking motion for which there was no provision in my previous invention.

Figure 1:
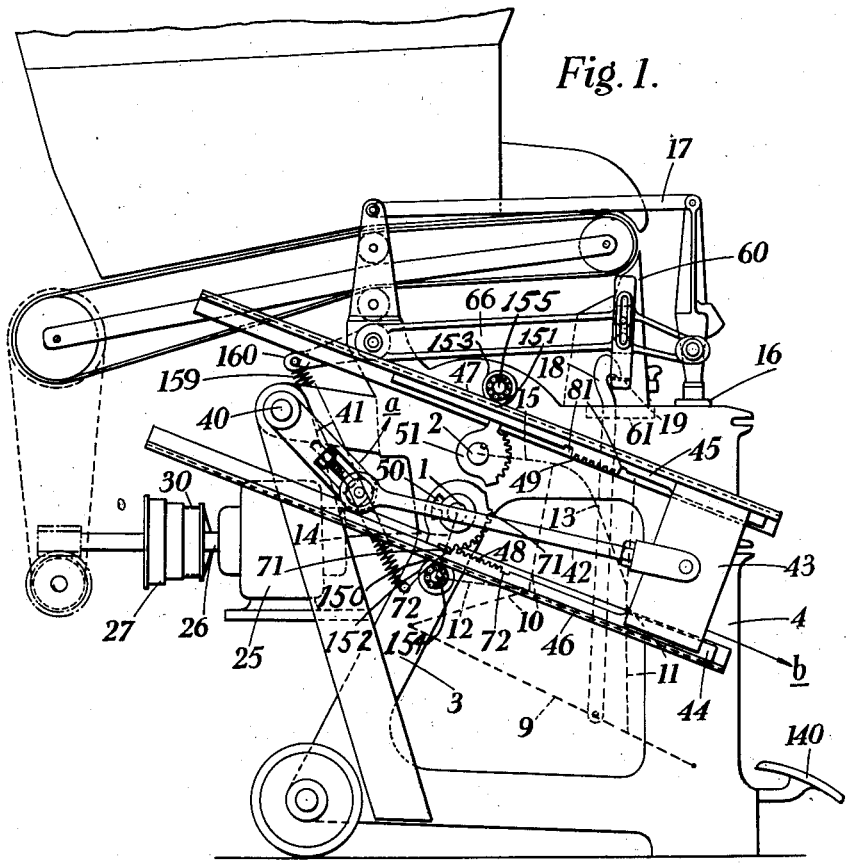

Referring now to Figs. 1 and 2, the press itself, as distinguished from the mechanical driving and operating means and the feed device, is substantially the same as that described in the above-mentioned patent and comprises a frame 3 of which the vertical hollow standards 4 serve to support a mold 5 and guide a cross-head 6 which supports a movable bottom plate 7 for the mold on pressure rods 8. The cross-head 6 is moved by a transmission lever 9 which is operated by the action of the compression toggles 10 and ejection toggles 11; these toggles being in their turn actuated by the compression and ejection shafts 1 and 2 through links 12 and 13 and arms 14 and 15 respectively. A top pressure plate 16 for the mold 5 is carried by parallel motion links 66, 17, and a hooked rod 18 is provided which snaps over a bail 19 on the link 66 when the top plate is lowered. The rod 18 is pivoted to the transmission lever 9 at its lower end and serves to press the top plate downwards when the bottom plate 7 is pressed upwards. A cam 20 carried by the compression shaft 1, a cam follower 21, a bell-crank lever 22, a link 23 and a helical spring 24 operate to withdraw the hooked rod 18 to release the bail 19 when the pressure operation has been completed, in the same manner as described in my above-mentioned patent. Furthermore certain parts of the mechanism are duplicated to give ease of operation as is also described in the said prior patent.

The drive for operating the press is conveniently provided by an electric motor 25 situated on the lefthand side of the machine and indicated in Fig. 1; in order to save repetition the side of the machine shown in Fig. 1 will be called the left side and the side shown in Fig. 2 the right side, and the end of the machine at which the mold is situated and the end at which the electric motor is placed will be hereinafter referred to as the front and rear respectively. The shaft 26 of the motor 25 is extended and carries a cone-pulley 27 and the drive is transmitted to a main driving shaft 28 on the left side by means of a cone-pulley 29 carried thereon, which corresponds to the cone-pulley 27, and a belt 30. This main shaft 28 carries a worm 31 which drives a shaft 40 through a worm wheel 32 and gears 33, 34, 35, 36. This shaft 40 lies transversely across the machine and has a variable crank 41 fixed thereto on the left side which carries a connecting rod 42. This connecting rod 42 engages a plate 43 to which are secured two parallel slides 44, 45 which are capable of moving in guides 46, 47 and carry racks 48, 49 respectively, these latter being offset lengthwise in relation to each other. Mutilated pinions 50 and 51 are keyed to the compression and extrusion shafts 1 and 2 respectively and each have the required number of teeth to correspond with those of the associated rack.

On the right side of the machine a four lobed-cam 37 is fixed to a shaft 38 which carries and is driven by the worm wheel 32. An arm or crank 39 carried on the right end of the compression shaft 1 is arranged to be swung over to the position shown in Fig. 2 in which a cam follower 52 mounted thereon is brought into contact with the cam 37 when the pinion 50 is turned by the rack 48 in a counterclockwise direction as seen in Fig. 1.

The operation of the machine will now be described beginning at the position of the parts illustrated in Figs. 1 and 2. The shaft 40 turns in the direction indicated by the arrow $a$ and the slides 44, 45, as shown in Fig. 1, are moving in the direction of the arrow $b$; the flats 53 and 54 of the pinions 50 and 51 respectively are thus in contact with the plane faces of the slides and remain so until the crank 41 has passed its forward dead centre and reached a position which brings the rack 48 and the pinion 50 into the same relative positions as those shown but with the rack 48 moving in a direction opposite to that indicated by the arrow $b$. During this period of crank movement the shafts 1 and 2 receive no drive from the crank 41 and the shaking operation is carried out. The position of the crank 39 shown in Fig. 2 corresponds with the position of the pinion 50 shown in Fig. 1 and the necessary movement of the shaft 1 is permitted by means of a lost motion connection provided between it and the pinion 50. This connection is shown more clearly in Fig. 3 and is effected by having the key way 55 on the pinion 50 formed of greater width than the key 56 which is carried by the shaft 1.

As will be evident from the foregoing description and Fig. 2, the shaking action results from the lifting and dropping of the cam follower 52 by the combined action of the cam 37 and a return spring 57 fixed at one end to the crank 39. The shaking action causes the transmission lever 9 to rock about its connection with the ejection toggles 11 and to impart slow upward and quick downward reciprocation to the movable bottom plate 7 of the mold. When the shaking is finished a pawl 58 carried by the shaft 40 acts to disengage a clutch 59 and so disconnects the mainshaft 28 from the motor 25 in a manner which will be described later. The operator now strikes off the top of the mold by hand or by returning a filling box 60 to its normal position and thereby carrying any excess of material to a plate 61. When this has taken place the top plate 16 is snapped down by hand to close the mold thus bringing the bail 19 under the hook of the rod 18 and causing a stud 63 on the link 66 to come into contact with one arm of, and rock, a bell-crank lever 69 thereby re-engaging the clutch 59. It will be noted that Fig. 1 shows the links 66, 17 in the lowered position, with the bail 19 engaged by the hooked rod 18, and that Fig. 2 shows the links in the raised position.

Springs 159 fixed to rearward extensions 160 of the links 66 are so chosen that they nearly counter-balance the swinging system and thus render it easy to move the top plate 16 downwards by hand.

Figure 5:
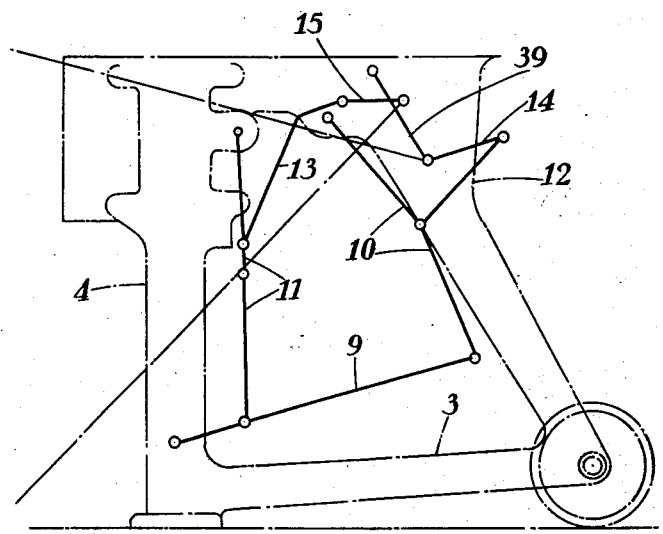
Fig. 5 is a diagrammatic view showing the positions of the various levers in their positions at which the ejection operation is about to commence.

The shaft 40 now rotates again and the rack 48 moves in the opposite direction to that indicated by the arrow $b$ and starts to turn the pinion 50 by engaging with the teeth thereof; in order to ensure that engagement shall take place at the correct instant between the pinion 50 and the rack 48 enlarged teeth 71 are provided on the pinion 50 and correspondingly deep grooves 72 are formed at the ends of the rack 48. The pinion 50 is thus turned in a clockwise direction as shown in Fig. 1, and thus brings the toggles 10 into and past the position of maximum pressure, to the position shown in Fig. 5; the crank 39 is also moved into the position shown in that figure and the hooked lever 18 is withdrawn from the bail 19 as indicated above. When the rack 48 has passed the pinion 50 the flat 82 of this latter is brought into contact with the former and the shaft 1 is again held against rotation.

Figure 6:
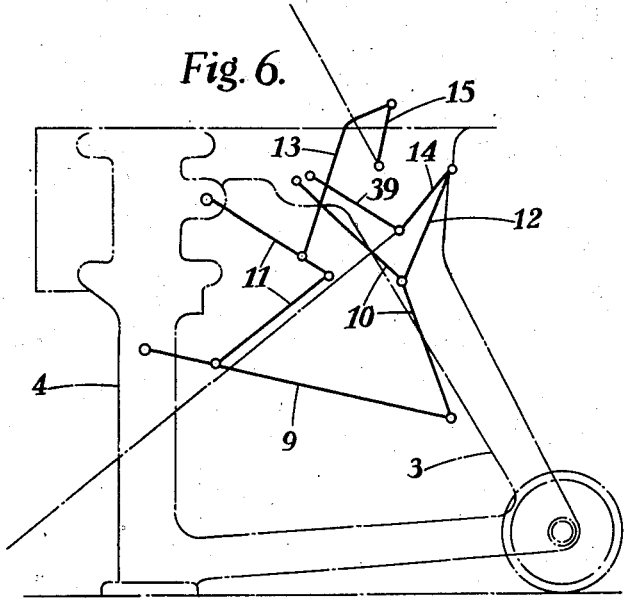
Fig. 6 is a view similar to Fig. 5 at the end of the ejection operation.

As the crank 41 continues to move towards its back dead centre position the rack 49 is brought against the teeth of the pinion 51 thus turning the ejection shaft 2 (it will be noted that enlarged teeth 80 are provided on the pinion 51 and that deep grooves 81 are formed at each end of the rack 49 to ensure engagement, in the same manner as on the pinion 50 and the rack 48). This turning of the shaft 2 swings the arm 15 upwards, breaks the toggle 11 and causes the transmission lever 9 to swing about its connection with the compression toggles 10 thus raising the bottom plate 7 of the mold and ejecting the block therefrom. A flat 74 formed on the pinion 51 is now brought against the rack 49 and rotation of the shaft 2 is prevented during the time which the crank 41 takes to pass its back dead centre and to bring the rack 49 again in contact with the pinion 51. During this period the toggles remain in the positions shown in Fig. 6 and the bottom plate 7 remains in its uppermost position; this gives the operator time to remove the finished block by hand.

Figure 3:
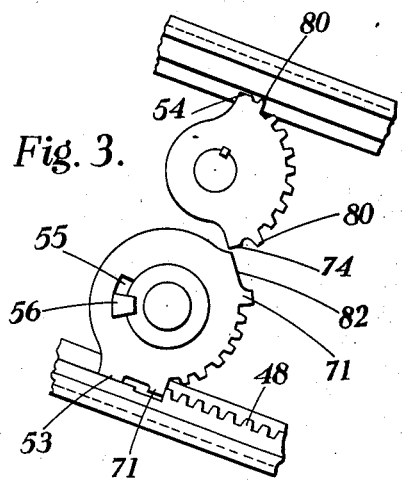
Fig. 3 shows the mutilated pinions used in the compression and extrusion shafts driving mechanism.

When the crank 41 has passed its back dead centre and brought the rack 49 against the pinion 51 this latter is turned in the opposite direction to that in which it has just been moved, and the bottom plate 7 is moved to its lower position which is reached when the rack 49 has passed the pinion 51. Practically immediately thereafter the rack 48 engages with the pinion 50 and begins to rock it, and therefore the shaft 1, in a counter-clockwise direction as seen in Figs. 1 and 3 thereby swinging the arm 39 over to the position in which the cam follower 52 is brought into contact with the cam 37. During this movement of the shaft 1 the operator fills the mold and when the movement is completed the various components of the mechanism are again in the positions shown in Figs. 1 and 2, the shaking operation is about to begin and the whole cycle of operations is repeated for the new block.

Figure 4:
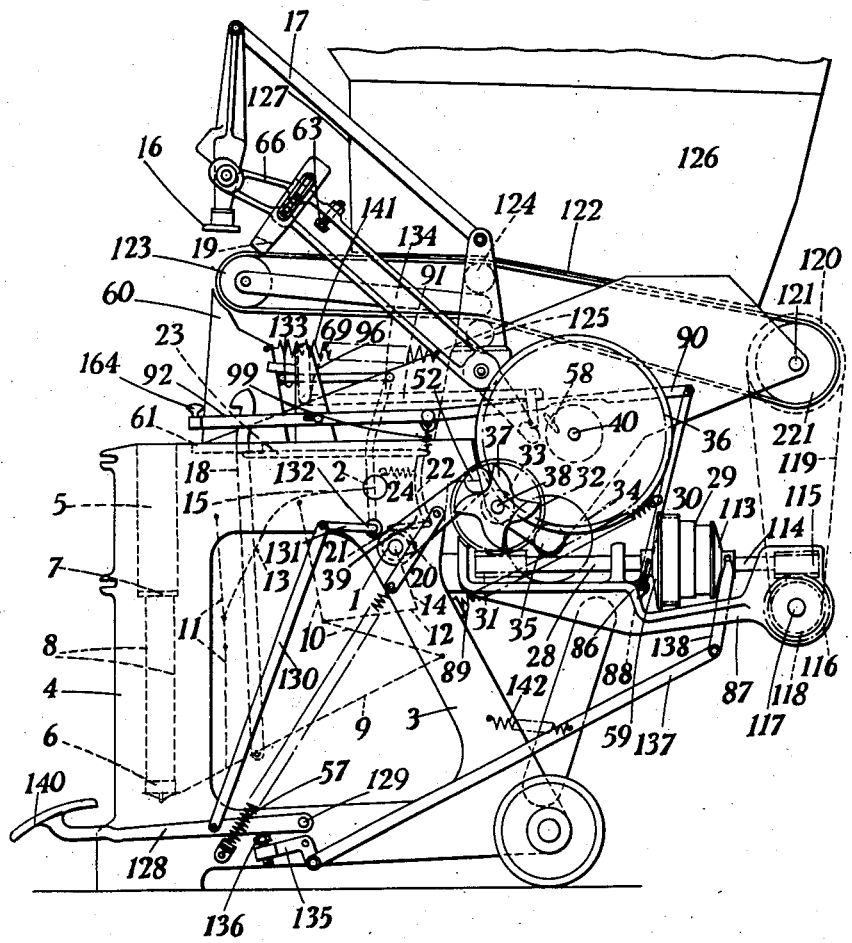
Fig. 4 shows the clutch control mechanism.

The control mechanism for the clutch 59 will now be described with reference to Fig. 4 which shows the various moving parts as they would be seen from the left side of the machine.

This mechanism comprises a lever 85, by means of which the clutch 59 is engaged and disengaged, a system of three links 90, 91, 92, the bell-crank lever 69 which is operated by the downward movement of the swinging links 17, 66 as described above and the pawl 58. The link 90 is pivoted to the lever 85 at 103 and has a pin 97 which engages within a slot 98 formed in one end of the link 92. This link is supported by means of a pin 95, fixed to a bracket 96, which passes through a slot 102 formed in the link to permit longitudinal movement thereof; a knob 104, for hand control is carried at the front end of the link 92. The link 91 is pivoted at one end to the bell-crank lever 69 by means of a pin 105, is squared as at 106 at its other end to fit against an abutment step 94 formed on the link 90, and carries a stirrup 93 which embraces the link 90. A helical spring 99 is provided to retain the links in the correct position.

The clutch 59 is preferably of the ordinary cone type and is held in the engaged position by a helical spring in the usual manner. The lever 85, which is pivoted at 86 to a frame extension 87, carries a fork 88 for disengaging the clutch and a spring 89 is provided which tends to move the lever 85 towards the front of the machine, or, in other words, disengage the clutch 59. This spring 89 is stronger than the clutch spring and, when free to act, holds the clutch in the disengaged position. When the clutch is to be engaged the lever 85 must be pushed rearwards, against the action of the spring 89, to the position shown in Fig. 4; it is retained in this position for the required periods during the operation of the machine by means of a squared abutment 101 which fits against a step 100 formed on the link 90 and prevents it from moving forwards.

The arrangement is such that when the shaft 40 has reached the position at which the shaking operation is finished the end of the pawl 58 comes into contact with an abutment 107 formed on the link 90. The rotation then causes the pawl 58 to swing about a pivot 110, by means of which it is fixed between carrying discs 109, thus simultaneously raising the link 90 until the step 100 is clear of the abutment 101. The link 90 then moves forward under the influence of the spring 89 and so disengages the clutch. An arcuate profile 111 formed just behind the abutment 107 on the link 90 permits the pawl 58 to be swung back to its original position in relation to the discs 109 by means of its spring 108. An adjusting screw 112 may be provided to set the initial protrusion of the pawl at any desired amount. If it is desired to stop the machine at any other time than just after the shaking operation, the knob 104 is pressed thus rocking the link 92 about the pin 95 and the link 90 about the pin 103 until the step 100 is clear of the abutment 101.

The feed mechanism will now be described with particular reference to Fig. 2. A shaft 114 arranged in alignment with the main driving shaft 28 extends towards the rear and is provided with a clutch 113 by means of which it may be driven from the cone pulley 29. A worm 115 is carried on the rearmost end of the shaft 114 and engages with a worm wheel 116 fixed to a shaft 117 which also carries a sprocket wheel 118. A chain 119 transmits the drive from the wheel 118 to a second sprocket wheel 120 fixed to a shaft 121 which carries a roller 221. This roller and a roller 123 supported near the front of the machine, carry a belt conveyor 122 which passes over the intermediate guide rollers 124, 125. This conveyor forms the bottom of a hopper 126 which holds the material of which the blocks are to be made and movement of the upper run of the conveyor in the forward direction feeds the block material out beneath the front wall 127 of the hopper into the feed box 60.

The means for controlling the feed device consists of a lever 128 which is pivoted to the frame of the machine at 129 and actuated by means of a pedal 140. A link 130 transmits movement of this lever 128 to a crank 131 fixed to a shaft 132 which runs transversely across the machine frame. Two or any convenient number of cranks 134 are fixed along the shaft 132 and have pivotal connections with a number of arms 133 which are pivoted to the feed box 60 (Fig. 2, being a side elevation, only shows one crank 134 and one rod 133). Situated just below the pivot 129 is a bell-crank lever 135 which has an adjustable stop 136 carried by one arm which is so arranged that when the lever 128 has been sufficiently depressed to move the box 60 over the mold it contacts with the stop 136 and rocks the bell-crank lever 135, thereby engaging the clutch 113 by means of the movement imparted to a clutch control lever 138 through a rod 137. When the operator releases the pedal 140, that is to say, at the end of the shaking operation, the springs 141 return the feed box 60 and the lever 128 to their original positions, while the spring 142, which is stronger than the spring of the clutch 113, disengages this latter and returns the bell-crank lever and the rod 137 to their original positions.

The provision of the variable crank 41 is the most convenient way of altering the relative lengths of the periods of time for the various operations. Thus when the crank 41 is lengthened the periods during which the racks 48 and 49 are in contact with the pinions 50 and 51 will be relatively smaller fractions of the period of the whole cycle of operations than when the crank was shorter. Thus if the drive is geared so that the actual times during which the racks are in contact with the pinions is the same the result will be that a longer period of shaking and a longer pause after the rising of the bottom plate 7 will be obtained.

Owing to the fact that a very considerable thrust is exerted on the slides 44, 45 when racks 48, 49 engage with the pinions 50, 51 the guides 46, 47 are cut away at 150, 151, to permit annuli 152 and 153 to bear against the slides 44 and 45 respectively at points opposite to the points of contact of the pinions therewith. These annuli 152 and 153 are carried by stub shafts 154 and 155 respectively, by means of ball bearings, so that the thrust on the slides is transmitted to the frame of the machine and does not interfere with their smooth running in the guides 46, 47.

I claim:—

1. In a block molding press the combination of a mold adapted to contain the material to be molded, a toggle mechanism adapted to apply pressure to the material, a second toggle mechanism adapted to eject the compressed material from the mold, a transmission lever connected at different points to both said toggle mechanisms, means for imparting a shaking movement to said material to be molded in the mold prior to the compression thereof and means for operating said shaking, compressing and ejecting means from one shaft.

2. In a power driven molding process the combination of a mold adapted to contain the material to be molded, means for feeding said material into said mold, means for shaking the material in said mold, toggle means for compressing the material in said mold, toggle means for ejecting the compressed material from said mold and means for operating said feeding, shaking, compressing and ejecting means from one shaft.

3. In a block molding press the combination of a mold adapted to contain the material to be molded, a toggle mechanism adapted to apply pressure to the material, a second toggle mechanism adapted to eject the compressed material from the mold, a transmission lever connected at different points to both said toggle mechanisms, means for imparting a shaking movement to said material to be molded in the mold prior to the compression thereof, a pressure plate at each end of the mold, interconnecting mechanism causing the pressure plates to move in opposite directions relatively to said mold, means for operating said shaking, compressing and ejecting means from a single power drive, automatic means for interrupting said drive after said shaking operation and means for bringing said drive into operation again when the upper of said pressure plates engages with said interconnecting means.

4. In a block molding press the combination of a mold adapted to contain the material to be molded, a toggle mechanism adapted to apply pressure to the material, a second toggle mechanism adapted to eject the compressed material from the mold, a transmission lever connected at different points to both said toggle mechanisms, means for operating both said toggle mechanisms from one shaft, means for causing the various operations of said press to take place in the correct sequence, and means for controlling the relative lengths of the periods of time of the various operations.

5. In a power driven molding process the combination of a mold adapted to contain the material to be molded, means for feeding said material into said mold, means for shaking the material in said mold, toggle means for compressing the material in said mold, toggle means for ejecting the compressed material from said mold, means for operating said feeding, shaking, compressing and ejecting means from one shaft, means for interrupting the drive from said single shaft to said shaking, compressing and feeding means, means for bringing said drive into operation again when the upper of said pressure plates engages with said interconnecting means and means for interrupting and initiating the drive of said feeding means from said single shaft.

6. In a block molding press the combination of a mold adapted to contain the material to be molded, a toggle mechanism adapted to apply pressure to the material, a second toggle mechanism adapted to eject the compressed material from the mold, a transmission lever connected at different points to both said toggle mechanisms, means for moving said pressure toggle mechanisms, means for moving said ejection toggle mechanism and reciprocating means for operating both said toggle-moving means in the correct sequence.

7. In a block molding press the combination of a mold adapted to contain the material to be molded, a toggle mechanism adapted to apply pressure to the material, a second toggle mechanism adapted to eject the compressed material from the mold, a transmission lever connected at different points to both said toggle mechanisms, a compression shaft for actuating said pressure toggle mechanism, an ejection shaft for actuating said ejection toggle mechanism, reciprocating means for imparting angular movement to said compression and ejection shafts in a predetermined sequence, means for shaking said material in said mold and means for automatically initiating and interrupting said shaking by the action of said reciprocating means.

8. A molding press comprising a mold adapted to contain the material to be molded, toggle means for compressing the material in said mold, toggle means for ejecting the compressed material from said mold, a compression shaft for actuating said compression toggles, an ejection shaft for actuating said ejection toggles, a mutilated pinion carried by each of said shafts, reciprocating racks for engaging and actuating said pinions at predetermined intervals and means for driving said reciprocating racks.

9. In a block molding press the combination of a mold adapted to contain the material to be molded, a toggle mechanism adapted to apply pressure to the material, a second toggle mechanism adapted to eject the compressed material from the mold, a transmission lever connected at different points to both said toggle mechanisms, a compression shaft for actuating said pressure toggle mechanism, an ejection shaft for actuating said ejection toggle mechanism, a mutilated pinion carried by each of said shafts, a shaft operatively connected with a power drive, a crank carried by said shaft, a connecting rod connected to said crank, a reciprocating slide engaged by said connecting rod, guides for carrying said slide and racks formed on said slide and adapted to engage with and actuate said mutilated pinions.

10. In a block molding press the combination of a mold adapted to contain the material to be molded, a toggle mechanism adapted to apply pressure to the material, a second toggle mechanism adapted to eject the compressed material from the mold, a transmission lever connected at different points to both said toggle mechanisms, a compression shaft for actuating said pressure toggle mechanism, an ejection shaft for actuating said ejection toggle mechanism, a mutilated pinion carried by each of said shafts, a shaft operatively connected with a power drive, a crank carried by said shaft, a connecting rod connected to said crank, two reciprocating slides connected to said connecting rod, guides for said slides and a rack formed on each of said slides, said racks being displaced lengthwise in relation to one another and adapted to engage with and actuate said mutilated pinions.

11. In a block molding press the combination of a mold adapted to contain the material to be molded, a toggle mechanism adapted to apply pressure to the material, a second toggle mechanism adapted to eject the compressed material from the mold, a transmission lever connected at different points to both said toggle mechanisms, means for shaking the material in said mold, a compression shaft for actuating said compression toggle mechanism, an ejection shaft for actuating said ejection toggle mechanism, a mutilated pinion carried on each of said shafts, reciprocating racks for engaging with and actuating said mutilated pinions, means for causing said compression shaft to rock in a reciprocating manner to actuate said shaking means and means for driving said racks and said compression shaft rocking means from one shaft.

12. In a block molding press the combination of a mold adapted to contain the material to be molded, a toggle mechanism adapted to apply pressure to the material, a second toggle mechanism adapted to eject the compressed material from the mold, a transmission lever connected at different points to both said toggle mechanisms, a compression shaft for actuating said pressure toggle mechanism, an ejection shaft for actuating said ejection toggle mechanism, a cam, power driven means for operating said cam, a crank carried on said compression shaft, a cam follower carried by said crank and capable of cooperating with said cam and reciprocating means for driving said compression and ejection shafts and arranged to bring said cam into contact with said cam follower.

13. In a block molding press the combination of a mold adapted to contain the material to be molded, a toggle mechanism adapted to apply pressure to the material, a second toggle mechanism adapted to eject the compressed material from the mold, a transmission lever connected at different points to both said toggle mechanisms, means for imparting a shaking movement to said material to be molded prior to the compression thereof, a compression shaft for actuating said compression toggle mechanism, an ejection shaft for operating said ejection toggle mechanism, means for driving and stopping said shafts in such a manner that said compression shaft is swung into a position in which said shaking means are operative, held in that position, swung back through and just past the position of maximum pressure and held in this position while the ejection shaft moves to eject the compressed material from the mold, remains in this position and moves back again leaving the mold empty for renewed filling and means for driving said shaking means from the same shaft as said shaft driving means.

14. In a block molding press the combination of a mold adapted to contain the material to be molded, a toggle mechanism adapted to apply pressure to the material, a second toggle mechanism adapted to eject the compressed material from the mold, a transmission lever connected at different points to both said toggle mechanisms, means for operating both said toggle mechanisms from one shaft, a hopper for holding material to be molded, a feed box capable of being moved over said mold, a conveyor for carrying said material to said feed box and means for driving said conveyor from said toggle mechanism, operating shaft and moving said feed box when desired.

15. In a block molding press the combination of a mold adapted to contain the material to be molded, a toggle mechanism adapted to apply pressure to the material, a second toggle mechanism adapted to eject the compressed material from the mold, a transmission lever connected at different points to both said toggle mechanisms, means for operating both said toggle mechanisms from one shaft, a hopper for holding material to be molded, a feed box capable of being moved over said mold, a conveyor for carrying said material to said feed box, a pedal operated lever adapted to move said feed box over said mold, means to return said feed to its original position, a clutch for transmitting drive from said toggle mechanism operating shaft to said conveyor and means for engaging said clutch when said feed box is over said mold by continued movement of said pedal operated lever.

16. In a block molding press the combination of a mold adapted to contain the material to be molded, a toggle mechanism adapted to apply pressure to the material, a second toggle mechanism adapted to eject the compressed material from the mold, a transmission lever connected at different points to both said toggle mechanisms, means for imparting a shaking movement to said material to be molded prior to the compression thereof, a pressure plate at each end of the mold, interconnecting mechanism causing the pressure plates to move in opposite directions relatively to said mold, a compression shaft for actuating said compression toggle mechanism, an ejection shaft for actuating said ejection toggle mechanism, reciprocating means for operating said shaft, a crank for operating said reciprocating means, a third shaft for carrying said crank, means including a clutch from driving said third shaft, a pawl carried by said third shaft and adapted to engage with and release a withdrawal means for said clutch immediately after said shaking means has finished operating, means for re-engaging said clutch when the upper of said pressure plates is engaged with said interconnecting mechanism and means operable when desired to disengage said clutch.

17. In a block molding press the combination of a mold adapted to contain the material to be molded, means for vibrating the material in the mold, toggle means for applying pressure to the material at each end of said mold, means for opening the mold at one end and toggle means for ejecting the molded article from the other end.

18. In a block molding press the combination of a mold adapted to contain the material to be molded, means for vibrating the material in the mold, toggle means for applying pressure to the material at each end of said mold, means for opening the mold at one end, toggle means for ejecting the molded article from the other end and interconnecting mechanism causing all above-mentioned means to be operated from a single shaft in the correct sequence.

19. In a block molding press the combination of a mold adapted to contain the material to be molded, means for shaking the material placed into said mold, means for applying pressure to said material in said mold including a movable end closure, means for ejecting the molded article, interconnecting mechanism for controlling the movement of said shaking means and pressing and ejecting means whereby the machine automatically stops after said shaking operation and starts again when said mold end closure is placed into closing position.

20. In a block molding press the combination of a mold adapted to contain the material to be molded, a toggle mechanism adapted to apply pressure to the material, a second toggle mechanism adapted to eject the compressed material from the mold, a transmission lever connected at different points to both said toggle mechanisms, a compression shaft for actuating said pressure toggle mechanism, an ejection shaft for actuating said ejection toggle mechanism, a mutilated pinion carried by each of said shafts, a shaft operatively connected with a power drive, a crank carried by said shaft, a connecting rod connected to said crank, reciprocating slides engaged by said connecting rod, guides for carrying said slides, racks formed on said slides and adapted to engage with and actuate said mutilated pinions and means for transmitting the thrust on said slides directly to the frame of said press.

21. In a block molding press the combination of a mold adapted to contain the material to be molded, a toggle mechanism adapted to apply pressure to the material, a second toggle mechanism adapted to apply pressure to the material, a second toggle mechanism adapted to eject the compressed material from the mold, a transmission lever connected at different points to both said toggle mechanism, means for shaking the material in said mold, a compression shaft for actuating said compression toggle mechanism, an ejection shaft for actuating said ejection toggle mechanism, a mutilated pinion rigidly mounted on said ejection shaft, a second mutilated pinion carried on said compression shaft and having a lost motion connection therewith, reciprocating racks for engaging with and actuating said mutilated pinions, means for causing said compression shaft to rock in a reciprocating manner to actuate said shaking means and means for driving said racks and said compression shaft rocking means from one shaft.

22. A block molding press comprising in combination a mold adapted to contain the material to be molded, a toggle mechanism for applying pressure to a pressure plate at one end of said mold, a second toggle for moving said pressure plate further for ejecting the molded material from said mold, a transmission lever connected to both said toggle mechanisms and arranged to transmit the movement of each of said toggle mechanisms to said pressure plate, means for operating both said toggle mechanisms from one shaft, and means for causing the various operations of said press to take place in the correct sequence.

23. In a block molding press the combination of a mold adapted to contain the material to be molded, a toggle mechanism adapted to apply pressure to the material, a second toggle mechanism adapted to eject the compressed material from the mold, a transmission lever connected to both said toggle mechanisms and arranged to transmit the movement of both of said toggle mechanisms to cause the compression and ejection operations of said mold, means for operating both said toggle mechanisms from one shaft, and means for causing the various operations of said press to take place in the correct sequence.

WILLIAM HERBERT SMITH.